(12) United States Patent
Elias et al.

(10) Patent No.: US 11,459,815 B2
(45) Date of Patent: *Oct. 4, 2022

(54) DYNAMIC MULTI-PANE INSULATING ASSEMBLY AND SYSTEM

(71) Applicant: Kattmann Elias, LLC, Alpharetta, GA (US)

(72) Inventors: Christian Michael Elias, Alpharetta, GA (US); Thomas Tyler Kattmann, Cumming, GA (US); Christopher Ryan Price, Oakwood, GA (US)

(73) Assignee: Kattmann Elias, LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,946

(22) Filed: Oct. 6, 2020

(65) Prior Publication Data

US 2021/0017806 A1 Jan. 21, 2021

Related U.S. Application Data

(63) Continuation of application No. 16/279,041, filed on Feb. 19, 2019, now Pat. No. 10,815,719.

(Continued)

(51) Int. Cl.
*E06B 3/663* (2006.01)
*E06B 3/667* (2006.01)
(Continued)

(52) U.S. Cl.
CPC .......... *E06B 3/66366* (2013.01); *E06B 3/667* (2013.01); *E06B 3/66304* (2013.01);
(Continued)

(58) Field of Classification Search
CPC .. E06B 3/66366; E06B 3/667; E06B 3/66304; E06B 3/6715; E06B 3/677;
(Continued)

(56) References Cited

U.S. PATENT DOCUMENTS 10,815,719 B2 10/2020 Elias et al.
2008/0302059 A1 12/2008 Du Plessis
(Continued)

FOREIGN PATENT DOCUMENTS

JP 2006-076806 3/2006
JP 2006 076806 A 3/2006
(Continued)

OTHER PUBLICATIONS

International Preliminary Report on Patentability and Written Opinion of the International Searching Authority of International Application No. PCT/US2019/018483 dated Sep. 3, 2020.
(Continued)

*Primary Examiner* — Brian Handville
(74) *Attorney, Agent, or Firm* — Womble Bond Dickinson (US) LLP

(57) ABSTRACT

A dynamic multi-pane insulating assembly and system including methods for dynamically maintaining the thermal resistance value of the assembly and system. The dynamic multi-pane insulating assembly and system includes first and second gas permeable panes defining an evacuated gap in communication with a vacuum source; a first exterior pane spaced from the first gas permeable pane defining a first pressurized gap in communication with a source of pressurized gas; and a second exterior pane spaced from the second gas permeable pane defining a second pressurized gap in communication with the source of pressurized gas.

41 Claims, 5 Drawing Sheets

Related U.S. Application Data

(60) Provisional application No. 62/632,077, filed on Feb. 19, 2018.

(51) Int. Cl.
  *E06B 3/677* (2006.01)
  *E06B 3/67* (2006.01)
  *E06B 3/54* (2006.01)

(52) U.S. Cl.
  CPC ............ *E06B 3/677* (2013.01); *E06B 3/6715* (2013.01); *E06B 3/5427* (2013.01)

(58) Field of Classification Search
  CPC ..... E06B 3/5427; E06B 3/6612; Y02B 80/22; Y02A 30/249
  See application file for complete search history.

(56) References Cited

U.S. PATENT DOCUMENTS

2012/0315409 A1  12/2012  Jones
2016/0279895 A1* 9/2016  Marjanovic ........... B29C 64/245

FOREIGN PATENT DOCUMENTS

| JP | 3916009 B2 | 5/2007 |
| JP | 2015-145569 | 8/2015 |
| KR | 10-2016-0101620 | 8/2016 |
| WO | WO2012/095266 A1 | 7/2012 |
| WO | WO2017/171578 A1 | 10/2017 |

OTHER PUBLICATIONS

PCT International Search Report & Written Opinion which issued for corresponding PCT Application No. PCT/US2019/018483 dated Jun. 3, 2019.
Norton, Francis J.; Permeation of Gases through Solids; Journal of Applied Physics 28, 34 (1957); Published The American Institute of Physics 1957; https://aip.scitation.org/doi/pdf/10.1063/1.1722570; pp. 34-39.
Extended European Search Report for related Application No. 19755038.7 dated Sep. 21, 2021.

* cited by examiner

DYNAMIC MULTI-PANE INSULATING ASSEMBLY AND SYSTEM

CROSS-REFERENCE TO RELATED APPLICATION

The present application claims priority to and is a continuation of pending U.S. patent application Ser. No. 16/279,041, filed Feb. 19, 2019, which further claims priority to the benefit of the filing date of the previously filed U.S. Provisional Patent Application No. 62/632,077, filed Feb. 19, 2018, which applications are hereby specifically incorporated by reference as if presented herein in their entirety.

FIELD OF THE INVENTION

The present disclosure generally relates to multi-pane insulating glass units ("IGUs" or "IGs") and vacuum insulating glass units ("VIGUs" or "VIGs") for use in fenestration applications (e.g., windows and doors for buildings) and any other application where an IGU or VIGU might be used. In particular, it relates to a dynamic multi-pane insulating assembly configured to maintain the thermal resistance of IGUs and VIGUs at a high level and methods of making same.

BACKGROUND

Insulating glass units (also known as insulating glazing units or "IGUs" or "IGs") and vacuum insulating glass units (also known as vacuum insulating glazing units or "VIGUs" or "VIGs") are known. They comprise two or more parallel but spaced-apart sheets, or panes, of glass attached and/or sealed to one another around their respective peripheries. The gap between each pair of sheets or panes of glass (also known as "lites") defines a cavity. In IGUs, the cavity is filled with air and/or other gasses such as argon, krypton or xenon, whereas in VIGUs, the gap is "filled" with or contains a reduced-pressure atmosphere or a vacuum. Spacers (also known as "stand-offs" or "suspenders") are typically disposed within the gap of IGUs and VIGUs to maintain the gap between the opposing panes. In the case of VIGUs, spacers are particularly necessary in order to support the panes of glass against the pressure of the outside air, which otherwise might distort or damage the glass, or cause the two panes of glass to come in contact with each other so as to produce a thermal "short circuit," which can undesirably provide a thermally conductive path directly through the panes of glass.

Using vacuum to increase the insulating performance of window glazing components is known, and in fact many innovative approaches have been taught in the literature over the last 75 years. It is, however, readily observed by skilled practitioners of the art that the majority of the prior work relates to low-to medium-vacuum levels, i.e., vacuum levels within the range from about 760 torr (1 atmosphere of pressure at sea level) to about $10^{-3}$ torr. For purposes of this application, a "higher" level of vacuum is understood to correspond to a lower absolute pressure, e.g., a vacuum level of $10^{-4}$ torr is a higher vacuum than $10^{-3}$ torr. While the literature makes infrequent reference to the measured vacuum levels in glazing components, in many cases the maintainable vacuum level must be interpreted from careful evaluation of the materials exposed to the vacuum enclosure, the methods used to create the vacuum seal and the methods used to produce/maintain the vacuum condition in the enclosed space.

While the literature describing vacuum insulating window glazing components may not rigorously define the vacuum levels, literature from other industries, such as the electronics industry, defines different vacuum levels and the types of materials and processing methods required to achieve and maintain those specified vacuum levels. The common distinction between medium and high vacuum devices is a vacuum level of $10^{-3}$ torr. In other words, the range of high vacuum levels begins at about $10^{-3}$ torr and goes higher, i.e., in the direction toward and/or past $10^{-4}$ torr. In the case of vacuum insulating glass units ("VIGUs" or "VIGs") for windows, doors and other components, where it is desirable for the VIGs to retain a prescribed minimum vacuum level for an extended operating lifetime (e.g., 25 years), a vacuum containment system capable of initially maintaining a higher level of vacuum (e.g., $10^{-4}$ torr to $10^{-5}$ torr), may be necessary for the VIG to maintain a desired degree of thermal resistance over its lifetime, i.e., as the contained vacuum degrades.

One purpose of high vacuum insulating glass units ("HVIGUs") is to provide lower levels of heat losses between temperature controlled spaces and non-temperature-controlled spaces, or between different temperature controlled spaces, that are separated by this glazing unit (i.e., compared to VIGUs with low or medium vacuum levels). In such cases, providing this desired lower level of heat transfer over a long period of time is desirable. Since the ambient conditions in the uncontrolled space, most commonly the external atmospheric environment, produce a variety of stresses including thermal, pressure and mechanical vibration, and since, to a lesser extent, this also happens in the conditioned space, various embodiments of the HVIGU will be more or less capable of surviving the applied stresses while maintaining the desired minimum vacuum level. Thus, the design lifetime, i.e., the period of time that the HVIGU will maintain its desired level of performance, is one of the performance features of the HVIGU.

As previously described, IGUs, VIGUs and HVIGUs are typically constructed using at least two spaced-apart sheets or panes of glass, each of some prescribed thickness. The gap between two adjacent glass sheets or panes defines a cavity. In IGUs, the cavity is filled with air or other gasses such as argon, krypton or xenon, whereas in VIGUs and HVIGUs, the gap is "filled" with a reduced pressure atmosphere or a vacuum. Spacers (also known as "stand-offs" or "pillars") are typically disposed within the gap of IGUs, VIGUs and HVIGUs to maintain the gap. In the case of VIGUs and HVIGUs, spacers are particularly necessary in order to support the sheets against the pressure of the outside air, which otherwise might distort or damage the glass, or cause the two panes of glass to come in contact with each other so as to produce an undesirable thermal short circuit.

Conventionally, these glass panes are then sealed, typically along the edges, using some arrangement of sealing elements which are intended to isolate the evacuated volume from the surrounding atmospheric pressure. Since the primary objective of the VIGU or HVIGU is to provide a low thermally-conductive barrier between environmental spaces, each of which may have a higher or lower temperature with respect to the other, it is obvious to skilled practitioners of the art that the two panes of glass may reach temperature levels which vary distinctly from each other. In fact, for a given space-to-space temperature differential, the pane-to-pane temperature differential will typically increase as a function of reduced thermal conductivity of the VIGU or HVIGU. As a result of the temperature differential between the panes of glass, the panes may expand and contract differentially. This may also introduce differential movement of the spacers relative to one or both panes of glass.

Vacuum insulated glass units (VIGUs/HVIGUs) are of interest for window applications and particularly greenhouse window systems because of their extremely high insulating properties, with center-of-glass insulating or thermal resistance R values as high as R-13 or more, expressed in US units of British Thermal Units as ft$^{2\circ}$ F. hr/Btu (conductive U-Values or U-Factors of 0.077 or lower, expressed in US units of BTU/(hr ° F. ft$^2$)).

For these and other reasons, there is a need to provide a dynamic multi-pane insulating assembly with center-of-glass insulating or thermal resistance R values as high as R-13 or more with improved dynamic maintenance of the thermal resistance R values at a desired high level over the course of the lifetime of the installation of the assembly in view of the ever changing internal and external environmental factors.

SUMMARY

The present system provides, among other things, a dynamic multi-pane insulating assembly and system including methods for dynamically maintaining the thermal resistance value of the assembly and system. In one embodiment, the dynamic multi-pane insulating assembly and system can comprise: a first gas permeable pane; a second gas permeable pane; a first exterior pane; a second exterior pane; a vacuum source; and a source of pressurized gas. In this aspect, an evacuated gap having a predetermined thickness is defined between the first and second gas permeable panes into which a vacuum can be drawn. The first exterior pane is spaced from the first vacuum pane and defines a first pressurized gap between the first gas permeable pane and the first exterior pane. Similarly, the second exterior pane is spaced from the second vacuum pane and defines a second pressurized gap between the second gas permeable pane and the second exterior pane.

In operation, the vacuum source is placed into communication with the evacuated gap to maintain the vacuum present in the evacuated gap at a desired vacuum level. The source of pressurized gas is placed in communication with the respective first and second pressurized gaps to pressurize the gas within the respective first and second pressurized gaps to a desired set level, which is greater than or equal to a barometric pressure of the environment that is external to the dynamic multi-pane insulating assembly and system. Thus, in the closed system, pressurized gas from the respective first and second pressurized gaps permeates through the respective first and second permeable panes and into communication with the vacuum present in the evacuated gap.

In another aspect, the dynamic multi-pane insulating assembly and system can further comprise a control assembly that can include a processor that is in communication with the source of vacuum and the source of pressurized gas. A first and second pressure sensor can be provided. In this aspect, the first pressure sensor can be in communication with the processor and the evacuated gap and the second pressure sensor can be in communication with the processor and the respective first and second pressurized gaps. In operation, the processor, in response to sensed pressure from at least one of the first and second pressure sensors, can be configured to selectively actuate at least one of the source of vacuum and the source of pressurized gas to maintain a set level of vacuum within the evacuated gap at a desired level.

The control assembly can further comprise a third pressure sensor that is in communication with the external environment. In this aspect, the processor, in response to sensed pressure from the third pressure sensor and at least one of the first and second pressure sensors can be configured to selectively actuate at least one of the source of vacuum and the source of pressurized gas to maintain the set level of vacuum within the evacuated gap and the set level of pressure within the pressurized gaps at the desired level.

The control assembly can further comprise a fourth pressure sensor that is in communication with the environment enclosed by the dynamic multi-pane insulating assembly. In this aspect, the processor, in response to sensed pressure from the fourth pressure sensor and at least one of the first, second, and third pressure sensors can be configured to selectively actuate at least one of the source of vacuum and the source of pressurized gas to maintain the set level of vacuum within the evacuated gap and the set level of pressure within the pressurized gaps at the desired level.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
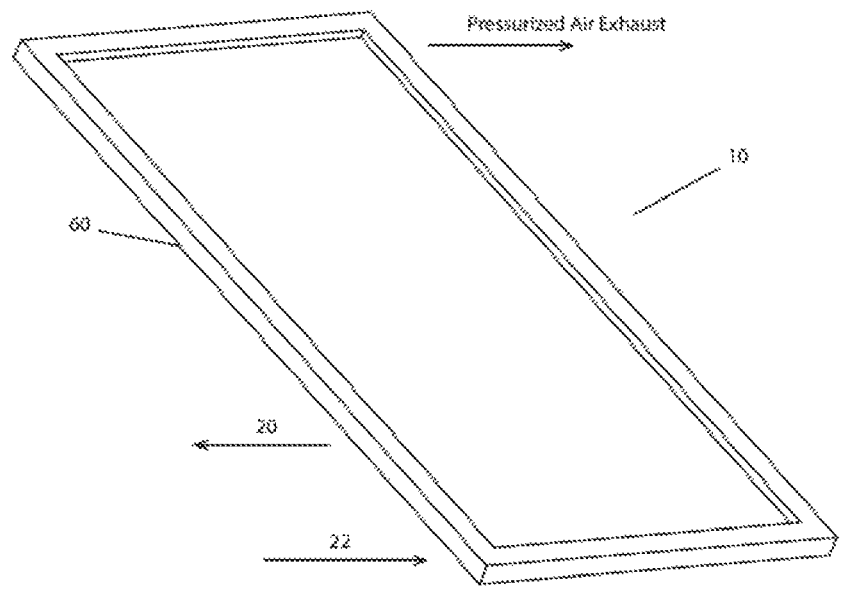
FIG. 1 is a schematic drawing illustrating generally one embodiment of a dynamic multi-pane insulating assembly and system and an environment in which it is used.
Figure 2:
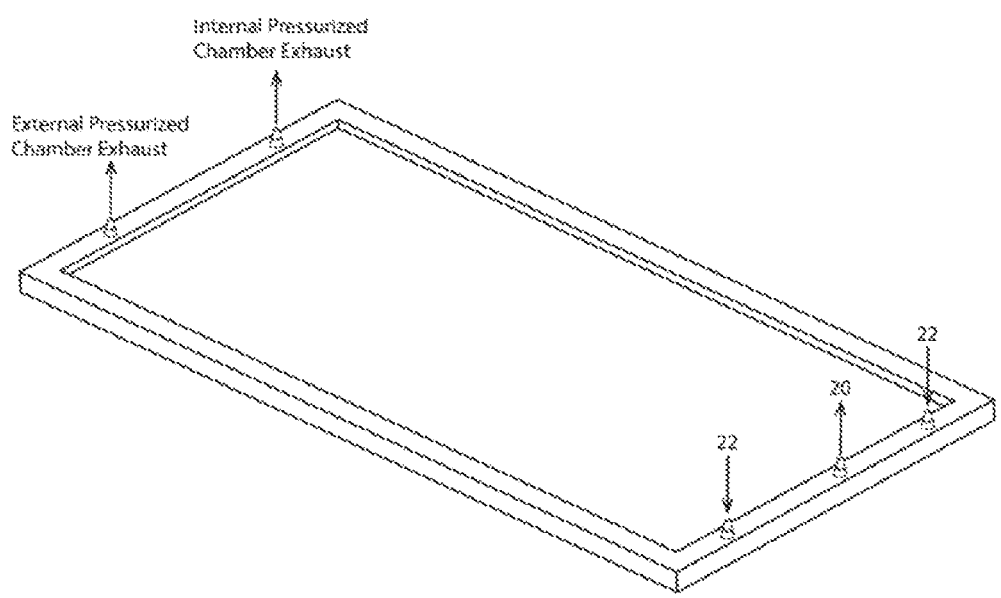
FIG. 2 is a schematic drawing illustrating generally one embodiment of a dynamic multi-pane insulating assembly and system coupled to a source of vacuum and a source of pressurized gas.
Figure 3:
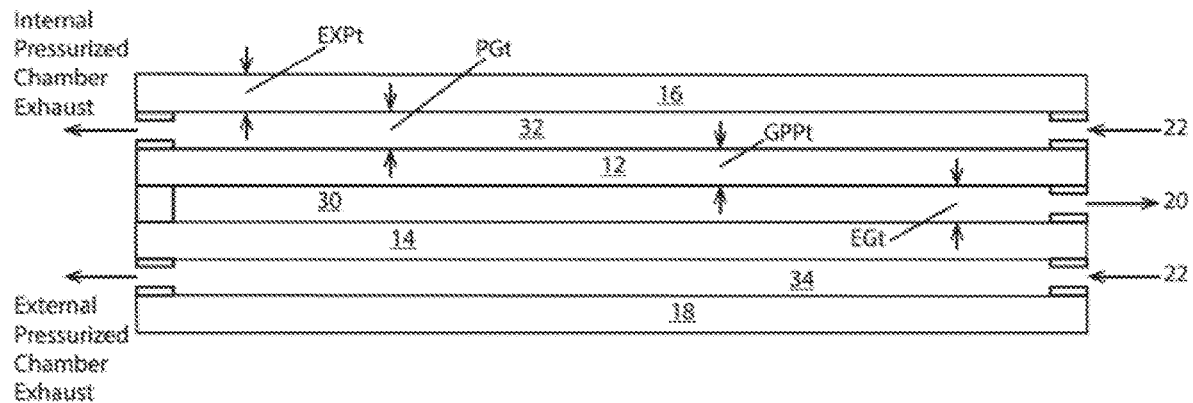
FIG. 3 is a schematic cross-sectional view of one embodiment of a dynamic multi-pane insulating assembly and system illustrated in FIG. 2, showing multiple panes hermetically mounted therein a frame of the assembly. The multiple panes including a first gas permeable pane and a second gas permeable pane, which defines an evacuated gap having a predetermined thickness into which a vacuum can be drawn from a source of vacuum. The multiple panes further include a first exterior pane defining a first pressurized gap between the first gas permeable pane and the first exterior pane and a second exterior pane defining a second pressurized gap between the second gas permeable pane and the second exterior pane, which first and second pressurized gaps are in communication with a source of pressurized gas.
Figure 4:
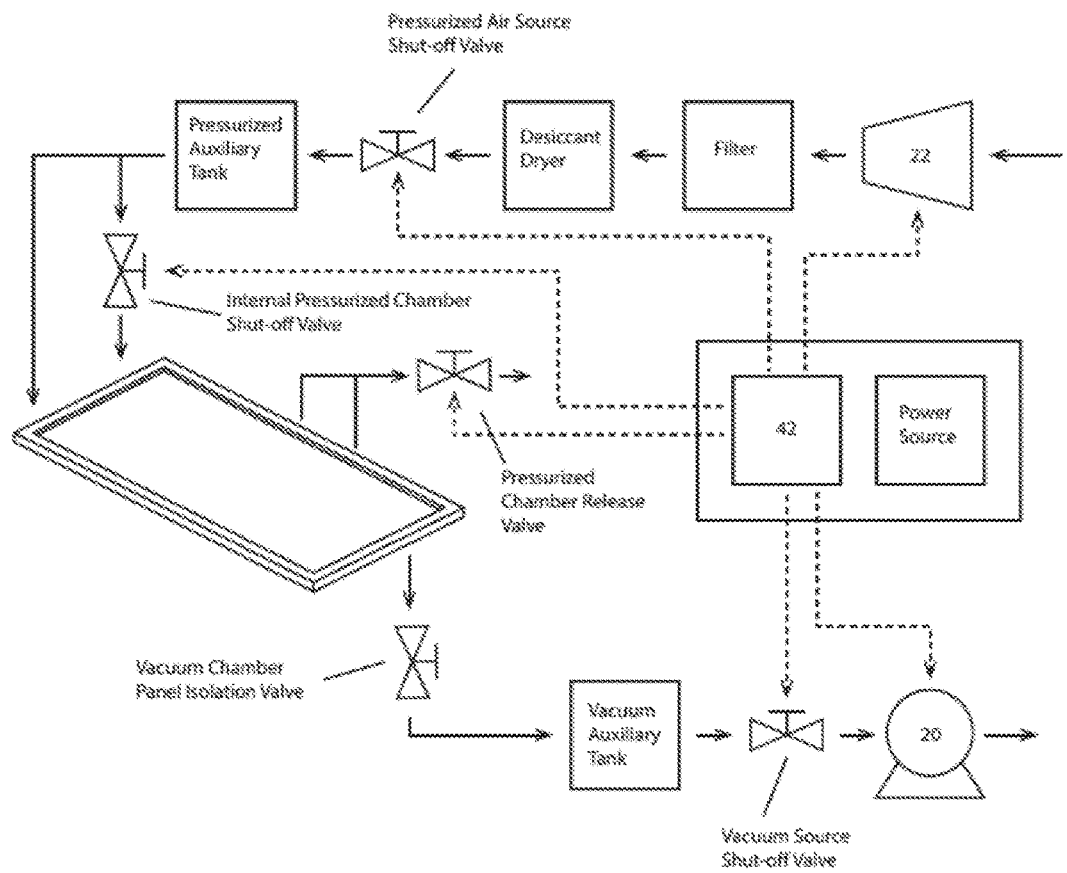
FIG. 4 is a schematic diagram illustrating generally one embodiment of a dynamic multi-pane insulating assembly and system coupled to a source of vacuum and a source of pressurized gas and showing a control assembly in communication with the dynamic multi-pane insulating assembly and the source of vacuum and the source of pressurized gas.
Figure 5:
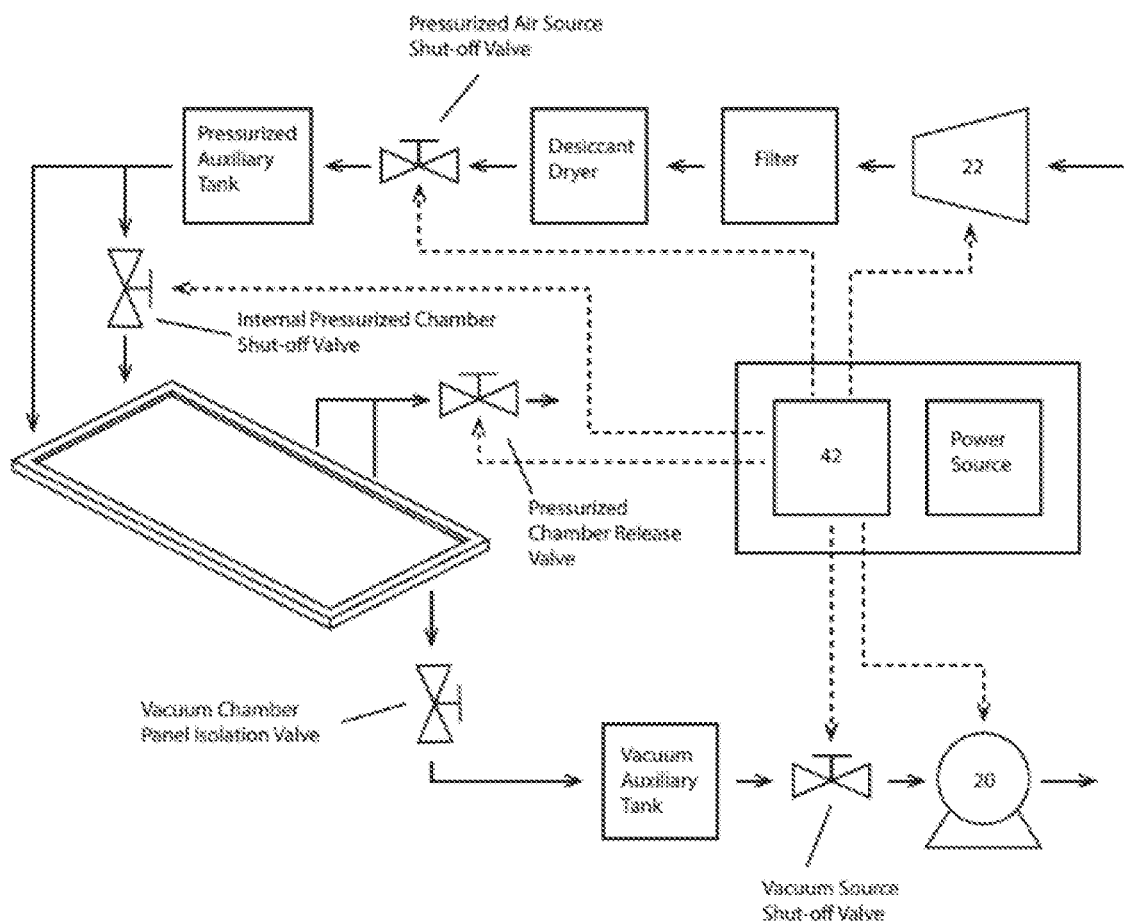
FIG. 5 is a schematic diagram illustrating one aspect of a control assembly that includes several different inputs to modify the rate at which pressurized gas and/or vacuum is delivered to the dynamic multi-pane insulating assembly, in one aspect the figures shows a control assembly configured to receive at least one signal from a pressure sensing circuit, at least one signal from a vacuum pressure sensing circuit, and at least one signal from an external environment pressure sensing circuit through which a processor of the control assembly can be configured to recognize the pressure level within the respective signals and showing the processor configured to send at least one signal to at least one of the source of vacuum and the source of pressurized gas to maintain the pressure level within the pressurized gaps of the dynamic multi-pane insulating assembly and the vacuum level within the evacuated gap of the dynamic multi-pane insulating assembly at desired levels, which allows for the dynamic multi-pane insulating assembly to have a desired and selectable level of thermal resistance.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a pane" can include two or more such panes unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

The present system provides, among other things, a dynamic multi-pane insulating assembly and system 10 including methods for dynamically maintaining the thermal resistance value of the assembly and system. In one embodiment, the dynamic multi-pane insulating assembly and system 10 can comprise: a first gas permeable pane 12; a second gas permeable pane 14; a first exterior pane 16; a second exterior pane 18; a vacuum source 20; and a source of pressurized gas 22. In this aspect, an evacuated gap 30 having a predetermined thickness is defined between the first and second gas permeable panes 12, 14 into which a vacuum can be drawn. The first exterior pane 16 is spaced from the first gas permeable pane 12 and defines a first pressurized gap 32 between the first gas permeable pane 12 and the first exterior pane 16. Similarly, the second exterior pane 18 is spaced from the second gas permeable pane 14 and defines a second pressurized gap 34 between the second gas permeable pane 14 and the second exterior pane 18.

Various embodiments of this invention relate to vacuum systems and pressurization systems comprising, without limitation, a plurality of dynamic multi-pane insulating assemblies whose vacuum spaces are connected to one another by ducts or conduits and to one or more vacuum pumps and whose pressurized spaces are connected to one another by ducts or conduits and one or more pressure pumps that operate during the service lives of the plurality of dynamic multi-pane insulating assemblies. A duct or conduit herein is any enclosure capable of allowing gas flow. By way of example only, and without limitation, a duct or conduit may comprise tubing, pipes, valves, pumps, and interconnections and fittings such as tees, flanges, and manifolds. The vacuum and pressurization pumps maintain most of the vacuum spaces and pressurized spaces at service pressures for a time period of indefinite duration or for an indefinite number of time periods of indefinite duration for the purpose of reducing heat conduction and convection through the residual gasses in the vacuum spaces.

In operation, the vacuum source 20 is placed into communication with the evacuated gap 30 to maintain the vacuum present in the evacuated gap 30 at a desired vacuum level. The source of pressurized gas 22 is placed in communication with the respective first and second pressurized gaps 32, 34 to pressurize the gas within the respective first and second pressurized gaps 32, 34 to a desired set level, which is greater than or equal to a barometric pressure of environment that is external to the dynamic multi-pane insulating assembly and system 10. Thus, in the closed system, pressurized gas from the respective first and second pressurized gaps permeates through the respective first and second permeable panes and into communication with the vacuum present in the evacuated gap 30. As one skilled in the art can appreciate, the vacuum within the evacuated gap 30 can be a partial vacuum. In a further operational aspect, the vacuum level within the evacuated gap 30 can be selectively configured to maintain the thermal resistance of the assembly at a desired level.

The dynamic multi-pane insulating assembly and system 10 theoretically permits heat transfer via visible light while minimizing convective and conductive heat transfer. In the case of convective and conductive heat transfer, the dynamic multi-pane insulating assembly and system 10 acts as an insulator. As described herein, the dynamic multi-pane insulating assembly defines an evacuated gap 30 between the first and second gas permeable panes 12, 14 into which a vacuum can be drawn and the first and second exterior panes 16, 18 and their adjacent spaced first and second gas permeable panes 12, 14 define the first and second pressurized gaps 32, 34. In one aspect, it is desired that the evacuated gap 30 be sized to create a sufficiently large vacuum chamber volume in order to allow for the desired level of molecular diffusion throughout the vacuum chamber towards the low pressure region or vacuum pump inlet. Increasing the predetermined distance between the respective first and second gas permeable panes 12, 14 can increase the total thermal resistance (R) by increasing $I_{vc}$, as calculated by:

$$R_{total} = 2\left[\frac{l_{glass}}{k_{glass}} + \frac{l_p}{k_p}\right] + \frac{1}{h_{air,1}} + \frac{1}{h_{air,2}} + \frac{A_{total}}{\frac{A_{stud}k_{stub}}{l_{vc}} + 0.312(P_{vc})^{0.292}A_{vacuum}},$$

where,
$l_{glass}$ [m]=exterior pane thickness,
$k_{glass}$ [W/mK]=exterior pane thermal conductivity,
$h_{air,1}$ [W/m²Km]=first pressurized gap coefficient of convection,
$h_{air,2}$ [W/m²Km]=second pressurized gap coefficient of convection,
$k_p$ [W/mK]=gas permeable pane thermal conductivity,
$l_{vc}$ [m]=evacuated gap thickness,
$k_{stud}$ [W/mK]=stud thermal conductivity,
$A_{total}$ [m²]=$(L_{operating})^2$,
$A_{stud}$ [m²]=$\pi(d_{stud})^2/2$, and
$A_{vacuum}$ [m²]=$(L_{operating})^2 - \pi(d_{stud})^2/2$.

In operation, it is contemplated that the relative thickness of the first and second pressurized gaps 32, 34 can affect the convective heat transfer taking place between the inner face of each glass sheet and the outer face of each polymer sheet in the air regime. In a further aspect, a decrease in the thickness of the first and second pressurized gaps 32, 34 can result in lower coefficients of convection under a certain threshold thickness.

In a further aspect, it is contemplated that the first and second pressurized gaps 32, 24 can be selectively pressurized with dry (i.e., low humidity air as described herein) to an operating pressure level sufficient to negate the water vapor pressure in the surrounding (exterior) environment. For example, assuming ideal gas behavior (valid for $P_{atm}$<5 atm), the operating pressure level required to negate the water vapor pressure is equal to the external atmospheric pressure. In operation, it is contemplated that pressure source can provide above atmospheric pressure, for example and without limitation, between about $10^{-2}$ to about $10^{-6}$ ATM gauge pressure, or between about $10^{-3}$ to about $10^{-8}$ ATM gauge pressure. It is desired to minimize moisture in the system as moisture can degrade the performance and/or structural integrity of the system, especially in those aspects in which the gas permeable panes comprise polymer materials. Thus, it is preferred that the relative humidity of the gas within the system is low as described in more detail herein.

Service pressure for the evacuated gap 30 can mean, without limitation. any gas pressure that significantly reduces heat conduction and convection through a gas or a mixture of gases such as air within the evacuated gap 30 and can depend on the dimensions of the vacuum space, which may include, without limitation, the dimensions between the first and second gas permeable panes 12, 14 of the dynamic multi-pane system and/or the elements of a spacer assembly defining the evacuated gap 30. It is contemplated that the gas load for the evacuated gap 30 can have multiple sources that may include, without limitation, gas permeation through the first and second gas permeable panes 12, 14 from the pressurized gases present in the respective adjoining first and second pressurized gaps 32, 34; outgassing of gases that have been absorbed in the materials surrounding the evacuated gap 30 or materials in communication with the evacuated gap 30; and evolution of gas species and materials generated by the first and second gas permeable panes 12, 14. It is contemplated that the largest source of gas loading for the evacuated gap 30 will comprise gas permeation through the first and second gas permeable panes 12, 14 from the pressurized gases present in the respective adjoining first and second pressurized gaps 32, 34. It is further contemplated that the outgassing from the materials forming the first and second gas permeable panes 12, 14 will be negligibly small and thus may not be a factor.

The vacuum source 20 can comprise, without limitation, valves, frit screens, temperature sensors, pressure sensors, air compressors, compressed air lines and pneumatically actuated devices, relays, solenoids, electrical cable, batteries, electric power generators, pumps, backup pumps, automated control systems, pump controllers, active and passive noise reduction systems, computers, computer cables, and computer programs. In part, and without limitation, it is contemplated that a vacuum source 20 can contribute to maintaining the vacuum pressures within the respective evacuated gaps of the dynamic multi-pane insulating assemblies by removing gases and gas species that permeate from the respective pressurized gaps into the evacuated gaps through the materials defining the evacuated gap 30. In part, and without limitation, it is contemplated that the vacuum source 20 can contribute to maintaining the vacuum pressures within the respective evacuated gaps of the dynamic multi-pane insulating assemblies by removing gases and gas species that enter the evacuated gaps through leaks or less than perfect seals. In some embodiments, the vacuum source 20 comprises at least $10^{-3}$ ATM. This includes embodiments in which the vacuum source 20 comprises at least $10^{-4}$ ATM, at least $10^{-5}$ ATM, or at least $10^{-6}$ ATM. In a further optional aspect, the vacuum source 20 can comprise between about $10^{-3}$ ATM to about $10^{-9}$ ATM.

Similarly, it is contemplated that the source of pressurized gas 22 can comprise, without limitation, valves, frit screens, temperature sensors, pressure sensors, air compressors, compressed air lines and pneumatically actuated devices, relays, solenoids, electrical cable, batteries, electric power generators, pumps, backup pumps, automated control systems, pump controllers, active and passive noise reduction systems, computers, computer cables, and computer programs. In part, and without limitation, it is contemplated that the source of pressurized gas 22 can contribute to maintaining the gas pressures within the respective first and second pressurized gaps 32, 34 of the dynamic multi-pane insulating assemblies at a desired level to ensure that the gases can permeate into the evacuated gaps through the materials defining the evacuated gap. In some embodiments, the source of pressurized gas 22 comprises providing pressurized gas at a set level greater than 1 atmosphere (ATM). This includes embodiments in which the source of pressurized gas 22 provides pressurized gas at a set level between about 1.01 ATM to about 1.0005 ATM (about 102340 pascals to about 101375 pascals, and preferably between about 1.001466 ATM to about 1.00001 ATM (about 101,500 pascals to about 101,300 pascals).

In one aspect, the pressurized gas can comprise, without limitation, one or more of: air, nitrogen, argon, krypton, xenon and the like. If the pressurized gas comprises air, it is contemplated that the pressurized air supplied to the respective first and second pressurized gaps 32, 34 will comprise air having a relatively low humidity. For this disclosure, relatively low humidity is defined as a humidity of less than about 30%, preferably, less than about 20%, more preferably less than about 10%, and still more preferred, less than about 1%. In another aspect, relatively low humidity can be defined as a humidity of between about 10.0 to 0.1%. Optionally, it is contemplated that pressurized air entering the respective first and second pressurized gaps can pass through a conventional desiccant device to ensure that the relative humidity of the pressurized gas entering the respective first and second pressurized gaps has the desired relatively low humidity value.

In one aspect, the respective first and second gas permeable panes 12, 14 can be formed of a substantially transparent material that is formed into a sheet. In one non-limiting example, it is contemplated that the first and second gas permeable panes 12, 14 can comprise a polymer material, such as acrylic, polycarbonate, and the like. The polymer material can also comprise polymer materials containing low concentrations of strength enhancing particles or, optionally, composite systems containing the aforementioned exemplary polymer materials positioned in alternate layers with polyethylene terephthalate and the like. The respective sheets forming the first and second gas permeable panes 12, 14 can comprises, without limitation, any polymeric material that is preponderantly flat with substantially even thickness but which may also have raised or contoured areas in regions that may function to maintain a space and separation between the otherwise flat and even thickness regions of the respective first and second gas permeable panes 12, 14. It is contemplated that a sheet forming at least one of the gas permeable panes can have coatings applied thereto all or respective portions of the sheet. Optionally, the permeable pane can have active and or passive devices or components imbedded within it or attached to a surface.

Optionally, it is contemplated that the respective first and second gas permeable panes 12, 14 can be formed of glass material that can comprise, without limitation, comprise tempered glass; laminated glass, such as, for example, glass sheets bonded together by a polymer, electrochromic glass, photochromic glass, and the like.

Each of the respective first and second gas permeable panes 12, 14 has a predetermined thickness ($GPP_t$). The respective first and second gas permeable panes 12, 14 can have the same or different predetermined thicknesses. In some embodiments, the predetermined thickness of the first and second gas permeable panes 12, 14 comprises at least 2 millimeters. This includes embodiments in which predetermined thickness of the first and second gas permeable panes 12, 14 comprises at least 3 millimeters, at least 4 millimeters, or at least 5 millimeters. Alternatively, it is contemplated that the predetermined thickness of the first and second gas permeable panes 12, 14 can be between about 2 millimeters to about 50 millimeters, preferably between about 3 millimeters to about 40 millimeters, and more preferred between about 6 millimeters to about 25 millimeters.

In another aspect, the respective first and second exterior panes 16, 18 can be formed of a substantially transparent material. In one non-limiting example, it is contemplated that the first and second the first and second exterior panes 16, 18 can comprise a glass material formed into a glass sheet. The glass material can, without limitation, comprise tempered glass; laminated glass, such as, for example, glass sheets bonded together by a polymer, electrochromic glass, photochromic glass, and the like. The respective glass sheets forming the first and second exterior panes 16, 18 can comprises, without limitation, any glass material that is preponderantly flat with substantially even thickness but which may also have raised or contoured areas in regions that may function to maintain a space and separation between the otherwise flat and even thickness regions of the first and second exterior panes 16, 18 and the flat and even thickness regions of the respective adjacent glass sheets of the first and second gas permeable panes 12, 14. It is contemplated that a glass sheet can have coatings applied thereto all or respective portions of the sheet. It is also contemplated that the glass sheet can have active and or passive devices or components imbedded within it or attached to a surface.

Optionally, like the previously described first and second gas permeable panes 12, 14, it is contemplated that the first and second exterior panes 16, 18 can comprise a polymer material can comprise a polymer material, such as acrylic, polycarbonate, and the like, that is formed into a sheet. In this exemplary aspect, the polymer material can also comprise polymer materials containing low concentrations of strength enhancing particles or, optionally, composite systems containing the aforementioned exemplary polymer materials positioned in alternate layers with polyethylene terephthalate and the like.

Each of the respective first and second gas exterior panes has a predetermined thickness ($EXP_t$). The respective first and second exterior panes 16, 18 can have the same or different predetermined thicknesses. In some embodiments, the predetermined thickness of the first and second exterior panes comprises at least 1 millimeter. This includes embodiments in which predetermined thickness of the first and second exterior panes 16, 18 comprises at least 2 millimeters, at least 3 millimeters, or at least 4 millimeters. Alternatively, it is contemplated that the predetermined thickness of the first and second exterior panes can be between about 1 millimeter to about 25 millimeters, preferably between about 1.5 millimeters to about 20 millimeters, and more preferred between about 3 millimeters to about 13 millimeters.

In various optional aspects, the predetermined thickness ($EG_t$) of the evacuated gap 30 can be between about 1 to about 50 millimeters; between about 2 to about 40 millimeters; between about 4 to about 30 millimeters, and preferably between about 6 to about 26 millimeters. In another aspect, the predetermined thickness ($EG_t$) of the evacuated gap 30 can be between about 1 to about 26 millimeters.

Similarly, it is contemplated that the first and second pressurized gaps 32, 34 can have a predetermined thickness ($PG_t$) of between about 0.5 to about 20 millimeters; between about 1 to about 25 millimeters between about 2 to about 30 millimeters; and preferably between about 3 to about 40 millimeters. The predetermined thickness of the first pressurized gap 32 can be substantially the same as the predetermined thickness of the second pressurized gap 34 or, optionally, can differ from the predetermined thickness of the second pressurized gap 34. Further, the predetermined thickness of the evacuated gap 30 can be substantially the same as at least one of the predetermined thickness of the respective first and second pressurized gaps.

In an optional aspect, the dynamic multi-pane assembly can further comprise a spacer assembly disposed between the first and second gas permeable panes 12, 14 for maintaining the desired predetermined thickness of the evacuated gap 30. In one aspect, it is contemplated that the spacer assembly can be configured to float with respect to at least one of first and second gas permeable panes 12, 14. The spacer assembly can comprise, without limitation, any physical element or number of elements that contribute to resisting the collapse of the evacuated gap 30 under the total or partial compressive load of the applied vacuum. For example, and without limitation, the spacer assembly can comprise discrete spacers of any size or shape arranged in any pattern in between the respective sheets of the first and second gas permeable panes 12, 14, which can be totally or partially optically clear. In a further aspect, discrete spacers for dynamic multi-pane assembly can include any portion of a spacer assembly comprising individual spacers that, excluding any connections to a gas permeable pane, are unconnected and that are arranged in some pattern in between the respective sheets of the first and second gas permeable panes 12, 14.

In another aspect, the dynamic multi-pane insulating assembly and system 10 can further comprising a control assembly 40 that can include a processor 42 that is in communication with the vacuum source 20 and the source of pressurized gas 22. In optional aspects, the vacuum source 20 and/or the source of pressurized gas 22 can be configured to be controlled to operate continuously or under active control to maintain vacuum pressure within the evacuated gap 30 at a desired level and/or the pressures within the respective first and second pressurized gaps 32, 34 at a desired set level.

The dynamic multi-pane insulating assembly and system 10 can further comprise a first and second pressure sensor 50, 52. In this aspect, the first pressure sensor 50 can be in communication with the processor and the evacuated gap 30 and the second pressure sensor 52 can be in communication with the processor and the respective first and second pressurized gaps 32, 34. In operation, the processor 42, in response to sensed pressure from at least one of the first and second pressure sensors, can be configured to selectively actuate at least one of the vacuum source 20 and the source of pressurized gas 22 to maintain a set level of vacuum within the evacuated gap 30 and a set level of pressure within the pressurized gaps 32, 34 at a desired level.

The control assembly 40 can further comprise a third pressure sensor 54 that is in in communication with the external environment. In this aspect, the processor 42, in response to sensed pressure from the third pressure sensor 54 and at least one of the first and second pressure sensors can be configured to selectively actuate at least one of the vacuum source 20 and the source of pressurized gas 22 to maintain the set level of vacuum within the evacuated gap 30 and a set level of pressure within the pressurized gaps 32, 34 at the desired level.

The control assembly 40 can further comprise a fourth pressure sensor 56 that is in in communication with the environment enclosed by the dynamic multi-pane insulating assembly 10. In this aspect, the processor 42, in response to sensed pressure from the fourth pressure sensor 56 and at least one of the first, second, and third pressure sensors can be configured to selectively actuate at least one of the vacuum source 20 and the source of pressurized gas 22 to maintain the set level of vacuum within the evacuated gap 30 and a set level of pressure within the pressurized gaps 32, 34 at the desired level.

The dynamic multi-pane assembly 10 further comprises a frame 60 into which the respective first and second gas permeable panes 12, 14 and the respective first and second exterior panes 16, 18 are spaceably and sealably mounted. It is further contemplated that the respective sheets of the first and second gas permeable panes 12, 14 and the respective first and second exterior panes 16, 18 are hermetically sealed with respect to the frame 60 via conventional IGUs, VIGUs and HVIGUs construction methodologies and materials. By way of example only, and without limitation, an edge seal for hermetically sealing the respective sheets of the first and second gas permeable panes 12, 14 and the respective first and second exterior panes 16, 18 to the frame can comprise a polymer that can further include any of the edge seal technologies currently used for inert gas filled insulating glass units and may include composite, foam, and thermoplastic types of hermitical seals.

Figure 6:
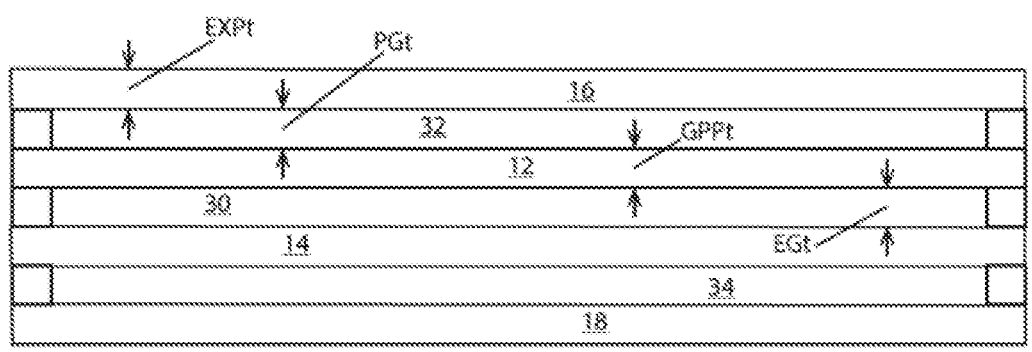
FIG. 6 is a schematic drawing illustrating generally one embodiment of a dynamic multi-pane insulating assembly showing respective polymeric first and second gas permeable panes and polymeric respective first and second exterior panes spaceably and sealably mounted within the dynamic multi-pane assembly in a glass pack configuration.
Figure 7:
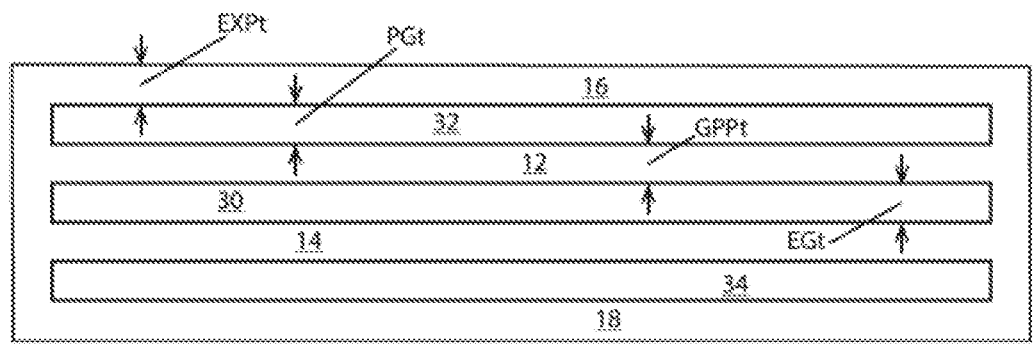
FIG. 7 is a schematic drawing illustrating generally one embodiment of a dynamic multi-pane insulating assembly showing respective polymeric first and second gas permeable panes and polymeric respective first and second exterior panes spaceably and sealably mounted within the dynamic multi-pane assembly in an extruded configuration.
Figure 8:
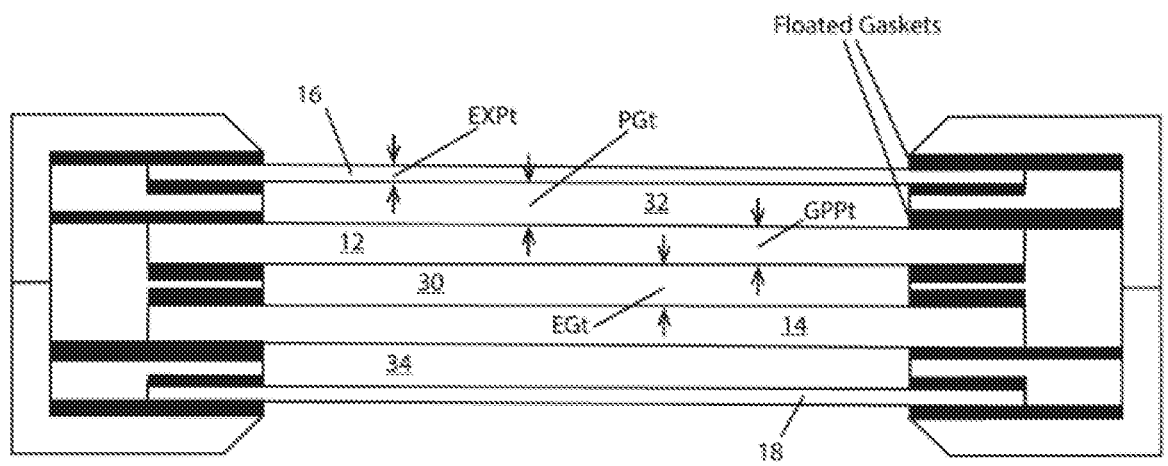
FIG. 8 is a schematic drawing illustrating generally one embodiment of a dynamic multi-pane insulating assembly showing respective polymeric first and second gas permeable panes and respective first and second exterior panes, formed from glass, spaceably and sealably mounted within the dynamic multi-pane assembly in a floating gasket configuration.

In various optional aspects it is contemplated that the respective first and second gas permeable panes 12, 14 and the respective first and second exterior panes 16, 18 can be spaceably and sealably mounted within the dynamic multi-pane assembly 10 by use of manufacturing processes such as, without limitation, glass pack methodologies (to form the glass pack configuration illustrated in FIG. 6); extrusion methodologies (to form the extruded configuration illustrated in FIG. 7); and floating gasket methodologies (to form the floating gasket configuration illustrated in FIG. 8). Using glass pack manufacturing processes, the respective first and second gas permeable panes 12, 14 and the respective first and second exterior panes 16, 18, which comprise four polymeric sheets, are attached to polymeric frame spacers in a stacking process to create a composite sash that holds the four polymer sheets together. Similarly, as shown in FIG. 7, an extruded manufacturing process provides for a cross section that is similar to the formed glass pack composite sash configuration and the resulting formed dynamic multi-pane assembly 10 can include the extruded lengths of the polymeric respective first and second gas permeable panes 12, 14 and the respective polymeric first and second exterior panes 16, 18 that are capped on the respective ends to seal the evacuated gap 30 and the respective first and second pressurized gaps 32, 34. In another exemplary method, float gasket manufacturing processes can form a dynamic multi-pane assembly 10 in which respective polymeric first and second gas permeable panes 12, 14 and the respective first and second exterior panes 16, 18, which are formed from glass, are mounted in a frame using gaskets in order to compensate for the thermal expansion differences between the polymer sheets (first and second gas permeable panes 12, 14) and the glass sheets (first and second exterior panes 16, 18).

Figure 9:
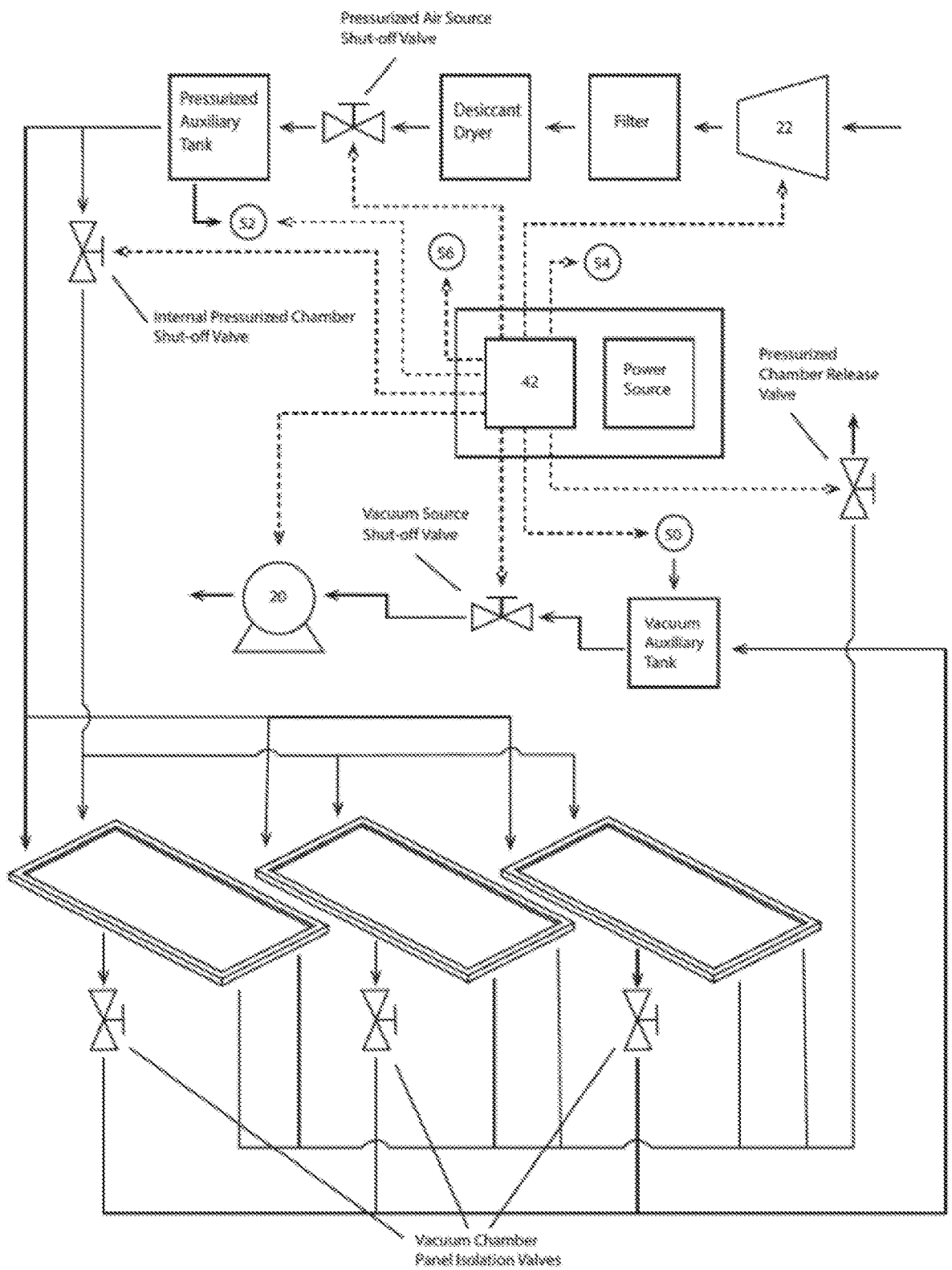
FIG. 9 is a schematic drawing illustrating generally one embodiment of an insulating system comprising a plurality of dynamic multi-pane insulating assemblies coupled to a source of vacuum and a source of pressurized gas.

In one aspect, and as schematically illustrated in FIG. 9, a thermal resistant system 2 can further comprise a plurality of dynamic multi-pane assemblies 10. In this aspect, the thermal resistant system can further comprise at least one vacuum duct 21 in communication with the vacuum source 20 and the evacuated gaps 30 of the plurality of dynamic multi-pane assemblies and at least one pressure duct 23 in communication with the source of pressurized gas 22 and the respective first and second pressurized gaps 32, 34 of the plurality of dynamic multi-pane assemblies.

In one example, and not meant to be limiting, the at least one vacuum duct 21 can be connected to a vacuum pump or multiple vacuum pumps. It is contemplated that one or more vacuum valves can be provided within the at least one vacuum duct, which can be selectively closed to isolate the vacuum ducts of the coupled dynamic multi-pane assemblies from the atmosphere. In this aspect, closing the vacuum valves allows for the maintenance of vacuum pressures in the evacuated gaps of the coupled dynamic multi-pane assemblies for some period of time, allowing the coupled pump(s) to be turned off for service or removed for replacement. Additional vacuum valves can be provided that can be configured to be selectively closed as a safety measure if there is a likelihood of a power failure. For example, and without limitation, it is contemplated that the vacuum valves can be selectively closed if there is a likelihood of a power failure or of damage to any of the dynamic multi-pane assemblies, if service needs to be performed on the thermal resistant system, there is a system failure, an anticipated or increased likelihood of a system failure, an event that could precipitate a system failure, or an anticipated event that could precipitate a system failure.

It is contemplated that the at least one vacuum valve can be remotely controlled via the processor. For example, and without limitation, the at least one vacuum valves can comprise conventional vacuum valves that are configured to the actuated to selectively close and or open manually, using compressed air, electrical energy (solenoid, motor), spring, or combination of these methods.

Optionally, at least one pressure sensor can be provided in the at least one vacuum duct, which is in communication with the processor, that is configured to initiate a signal to close the vacuum valve if the pressure begins to rise faster than a set rate or exceeds a set value.

Similarly, without limitation, the at least one pressure duct 23 can be connected to a pressure pump or multiple pressure pumps. It is contemplated that one or more pressure valves can be provided within the at least one pressure duct, which can be selectively closed to isolate the pressure ducts of the coupled dynamic multi-pane assemblies from the atmosphere. In this aspect, closing the pressure valves allows for the maintenance of gas pressures in the pressurized gaps of the coupled dynamic multi-pane assemblies for some period of time, allowing the coupled pressure pump(s) to be turned off for service or removed for replacement. Additional pressure valves can be provided that can be configured to be selectively closed as a safety measure if there is a likelihood of a power failure. For example, and without limitation, it is contemplated that the pressure valves can be selectively closed if there is a likelihood of a power failure or of damage to any of the dynamic multi-pane assemblies, if service needs to be performed on the thermal resistant system, there is a system failure, an anticipated or increased likelihood of a system failure, an event that could precipitate a system failure, or an anticipated event that could precipitate a system failure.

It is contemplated that the at least one pressure valve can be remotely controlled via the processor. For example, and without limitation, the at least one pressure valves can comprise conventional pressure valves that are configured to the actuated to selectively close and or open manually, using compressed air, electrical energy (solenoid, motor), spring, or combination of these methods.

Optionally, at least one pressure sensor can be provided in the at least one pressure duct, which is in communication with the processor, that is configured to initiate a signal to close the pressure valve if the pressure begins to fall faster than a set rate or exceeds a set value.

Any valve within the thermal resistant system can be independently open or closed while other valves in the thermal resistant system remain open or closed as desired. Thus, it is contemplated that number or combination of vacuum/pressure valves within the thermal resistant system can be selectively closed while others remain selectively open. Further, any vacuum/pressure valve within the thermal resistant system may be actuated to selectively close or open manually, remotely, or automatically as desired or according to some system parameter such as vacuum pressure, gas pressure, temperature, and the like.

The vacuum/pressure valve within the thermal resistant system 2 can be any commercially available vacuum valve or valve known in the art. Further, it is contemplated that any technologies, any processes, or any methods any of which are known in the art of vacuum/pressure engineering and vacuum/pressure systems can be employed in a thermal resistant system of the present invention that comprises a plurality of dynamic multi-pane assemblies.

The thermal resistant system 2 can provide a means for isolating one or more dynamic multi-pane assemblies in the event that affected dynamic multi-pane assembly's vacuum chamber is compromised. The means for isolating one or more dynamic multi-pane assemblies can comprise a tee valve that is placed in fluid communication with each dynamic multi-pane assembly 10. The tee valve can be electrically coupled to and selectively controlled via the control assembly 40 so that the thermal resistant system 2 can selectively isolate the failed dynamic multi-pane assembly 10 from the system. Optionally, it is contemplated that selectively controlled tee valves can be assigned to pluralities of dynamic multi-pane assemblies 10, such as, for example and without limitation, to one of every ten panels, or one of every twenty panels, or one of every thirty panels, and the like, so that potentially failed dynamic multi-pane assemblies 10 can be identified by the thermal resistant system 2 by the identification and isolation of the respective section of the system. It is further contemplated that the control assembly be programmed or otherwise configured to use sorting algorithms to isolate the section of the thermal resistant system 2 containing the failed dynamic multi-pane assemblies 10.

In a further optional aspect, the thermal resistant system 2 can further comprise a means for removing and/or reducing accumulation of snow thereon the respective exterior panes of the dynamic multi-pane assemblies 10 that form the thermal resistant system 2. As one will appreciate, in substantially non-vertical applications, such as for skylights, greenhouses, and the like, the transparent exterior panes of the dynamic multi-pane assemblies 10 can accumulate significant amounts of snow in certain environments due to the high R-value of the dynamic multi-pane assemblies 10 forming the thermal resistant system 2, which can pose both structural and operational problems. Structurally, allowing large amounts of snow to accumulate increases the weight or load on the underlying structure and the respective dynamic multi-pane assemblies 10 and operationally, resting snow can block the desired passage of adequate sunlight from passing through the dynamic multi-pane assemblies 10 and into the formed enclosure. The means for removing and/or reducing accumulation of snow provides the application of warm air from the interior volume of the enclosed structure to be selectively placed into fluid communication with the respective exterior pressurized gaps of the affected dynamic multi-pane assemblies 10. Operationally, the means for removing and/or reducing accumulation of snow can comprise the steps of turning on the compressor, closing an internal pressurized chamber shut-off valve, and opening a pressurized air source shut-off valve as well as a pressurized chamber release valve. Optionally, heating elements can be integrated into the external pressurized air plumbing network to ensure that the warm air being supplied to the with the respective exterior pressurized gaps of the affected dynamic multi-pane assemblies 10 is heated to a desired temperature.

It is contemplated that the high R-value of the dynamic multi-pane assemblies 10 forming the thermal resistant system 2, as shown in the exemplary test data provided below, can be attributed to the vacuum provided in the evacuated gap 30 between the first and second gas permeable panes 12, 14. It is further contemplated that the maintenance of a higher level of vacuum in the evacuated gap 30 will provide greater resistance to heat transfer across the multi-pane assembly. As shown below, thermal testing has shown R-values generally in excess of 80 F*ft²*hr/Btu, which is substantially higher than conventional insulating glass.

Test Results

The thermal resistant system 2 was tested using the follow equipment and procedure. A heating element, a Hg thermometer (which can be used to get an extra data point for the chamber temperature), a chamber thermocouple, and a plurality of fans were placed into an insulated cavity of an insulation box. Thermocouples were attached to the respective first and second exterior panes 16, 18 and a RTD probe was placed in the exterior environment. The RTD probe and thermocouples were coupled to a digital thermometer and the fans were coupled to a power source. The prototype dynamic multi-pane assembly 10 was placed above the insulated box cavity and coupled to respective vacuum and pressure sources. After the heating element was turned on, the insulated heating chamber was allowed to reach at least 40° C. above the ambient temperature before the heating element was turned off and subsequent recordation of the chamber, surface, and ambient temperatures were taken over time.

The change of the internal energy within the heated chamber over the change in time (the heat loss) was calculated using the equation below:

$$Q[W] = \frac{m_{air}C_{p,air}(T_f - T_i)}{t_f - t_i}$$

Once the heat loss has been calculated, the follow equation was used to solve for the operating R-values of the dynamic multi-pane assembly 10.

$$Q[W] = \frac{1}{R}A(T_{S,cold} - T_{S,hot})$$

It is noteworthy that the tests resulted in R values ranging from about 79 to about 98 80 F*ft²*hr/Btu.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

What is claimed is:
1. A dynamic multi-pane assembly comprising:
a first gas permeable pane;
a second gas permeable pane defining an evacuated gap between the first and second gas permeable panes, the evacuated gap having a predetermined thickness within which a vacuum is drawn, wherein each of the first and second gas permeable panes is formed into a sheet and comprises a polymer;
a first exterior pane spaced from the first gas permeable pane and defining a first pressurized gap between the first gas permeable pane and the first exterior pane;

a second exterior pane spaced from the second gas permeable pane and defining a second pressurized gap between the second gas permeable pane and the second exterior pane;
a vacuum source in communication with the evacuated gap;
a source of pressurized gas in communication with the respective first and second pressurized gaps,
a means for sensing pressure in the evacuated gap and the respective first and second pressurized gaps; and
a means for, in response to sensed pressure from at least one the respective first and second pressurized gaps, selectively actuating at least one of the source of vacuum and the source of pressurized gas to maintain a set level of vacuum within the evacuated gap at a desired level;
wherein the source of pressurized gas is pressurized at a set level that is greater than or equal to a barometric pressure of the external environment, and wherein gas from the respective first and second pressurized gaps permeates through the respective first and second permeable panes and into communication with the evacuated gap.

2. The dynamic multi-pane assembly of claim 1, wherein the first and second gas permeable panes are formed of a transparent material.

3. The dynamic multi-pane assembly of claim 2, wherein the first and second exterior panes are formed of a transparent material.

4. The dynamic multi-pane assembly of claim 2, wherein the polymer is polycarbonate.

5. The dynamic multi-pane assembly of claim 3, wherein the first and second exterior panes are formed of tempered glass.

6. The dynamic multi-pane assembly of claim 1, wherein the pressurized gas is one of at least air, nitrogen, argon, krypton and xenon.

7. The dynamic multi-pane assembly of claim 1, wherein the pressurized gas is air, and wherein the air has a low relative humidity.

8. The dynamic multi-pane assembly of claim 7, wherein the air has a humidity of less than 30%.

9. The dynamic multi-pane assembly of claim 1, wherein the predetermined thickness of the evacuated gap is between about 1 to 26 millimeters, wherein the first pressurized gap has a predetermined thickness of between about 2 to 40 millimeters, and wherein the second pressurized gap has a predetermined thickness of between about 2 to 40 millimeters.

10. The dynamic multi-pane assembly of claim 9, wherein the predetermined thickness of the first pressurized gap is substantially the same as the predetermined thickness of the second pressurized gap.

11. The dynamic multi-pane assembly of claim 1, wherein the vacuum within the evacuated gap is a partial vacuum.

12. The dynamic multi-pane assembly of claim 1, wherein the vacuum within the evacuated gap can be selectively configured to maintain the thermal resistance of the assembly at a desired level.

13. The dynamic multi-pane assembly of claim 1, further comprising a spacer assembly disposed between the first and second gas permeable panes for maintaining the evacuated gap therebetween.

14. The dynamic multi-pane assembly of claim 1, wherein the means for sensing pressure in the evacuated gap and the respective first and second pressurized gaps comprises:

a first pressure sensor in communication with the processor and the evacuated gap; and
a second pressure sensor in communication with the processor and at least one of the respective first and second pressurized gaps.

15. The dynamic multi-pane assembly of claim 14, wherein the means for selectively actuating at least one of the source of vacuum and the source of pressurized gas comprises a control assembly that comprises a processor in communication with the source of vacuum, the source of pressurized gas, the first pressure sensor, and the second pressure sensor.

16. The dynamic multi-pane assembly of claim 15, wherein the control assembly further comprises a third pressure sensor in communication with the external environment, and wherein the processor, in response to sensed pressure from the third pressure sensor and at least one of the first and second pressure sensors, selectively actuates at least one of the source of vacuum and the source of pressurized gas to maintain the set level of vacuum within the evacuated gap at the desired level.

17. The dynamic multi-pane assembly of claim 1, further comprising a frame, wherein the respective first and second gas permeable panes and the respective first and second exterior panes are spaceably mounted therein the frame.

18. The dynamic multi-pane assembly of claim 17, wherein each of the respective first and second gas permeable panes and the respective first and second exterior panes have a peripheral edge portion, and wherein the peripheral edge portions of each of the respective first and second gas permeable panes and the respective first and second exterior panes are hermetically sealed to the frame.

19. A thermal resistant system comprising:
a plurality of dynamic multi-pane assemblies, each dynamic multi-pane assembly comprising:
a first gas permeable pane;
a second gas permeable pane defining an evacuated gap between the first and second gas permeable panes, the evacuated gap having a predetermined thickness within which a vacuum is drawn, wherein each of the first and second gas permeable panes is formed into a sheet and comprises a polymer;
a first exterior pane spaced from the first gas permeable pane and defining a first pressurized gap between the first gas permeable pane and the first exterior pane; and
a second exterior pane spaced from the second gas permeable pane and defining a second pressurized gap between the second gas permeable pane and the second exterior pane; and
a vacuum source in communication with the evacuated gap of each dynamic multi-pane assembly;
a source of pressurized gas in communication with the respective first and second pressurized gaps of each dynamic multi-pane assembly;
a first pressure sensor in communication with the processor and the evacuated gap; and
a second pressure sensor in communication with the processor and at least one of the pressurized gaps, and
a means for, in response to sensed pressure from at least one the respective first and second pressure sensors, selectively actuates at least one of the source of vacuum and the source of pressurized gas to maintain a set level of vacuum within the evacuated gap and a set level of pressure within the pressurized gaps of each dynamic multi-pane assembly at a desired level,
wherein the source of pressurized gas is pressurized at a set level that is greater than or equal to a barometric pressure of the external environment, wherein gas from the respective first and second pressurized gaps permeates through the respective first and second permeable panes and into communication with the evacuated gap, and wherein the vacuum within the evacuated gap can be selectively configured to maintain the thermal resistance of the assembly at a desired level.

20. The thermal resistant system of claim 19, further comprising a vacuum duct in communication with the vacuum source and the evacuated gaps of each dynamic multi-pane assembly and a pressure duct in communication with the source of pressurized gas and the respective first and second pressurized gaps of each dynamic multi-pane assembly.

21. The thermal resistant system of claim 19, wherein the control assembly further comprises a third pressure sensor in communication with the external environment, and wherein the processor, in response to sensed pressure from the third pressure sensor and at least one of the first and second pressure sensors, selectively actuates at least one of the source of vacuum and the source of pressurized gas to maintain the set level of vacuum within the evacuated gap and a set level of pressure within the pressurized gaps of each dynamic multi-pane assembly at the desired level.

22. The thermal resistant system of claim 19, wherein each dynamic multi-pane assembly further comprises a frame, and wherein the respective first and second gas permeable panes and the respective first and second exterior panes are spaceably mounted therein the frame of each dynamic multi-pane assembly.

23. The thermal resistant system of claim 18, wherein the first and second gas permeable panes and the first and second exterior panes of each dynamic multi-pane assembly are formed of a transparent material.

24. The thermal resistant system of claim 19, wherein the polymer is polycarbonate.

25. The thermal resistant system of claim 23, wherein the first and second exterior panes of each dynamic multi-pane assembly are formed of tempered glass.

26. The thermal resistant system of claim 19, wherein the pressurized gas is one of at least air, nitrogen, argon, krypton and xenon.

27. The thermal resistant system of claim 19, wherein the pressurized gas is air, and wherein the air has a low relative humidity.

28. The thermal resistant system of claim 19, wherein the vacuum within the evacuated gap is a partial vacuum.

29. The thermal resistant system of claim 19, wherein each dynamic multi-pane assembly further comprises a spacer assembly disposed between the first and second gas permeable panes for maintaining the evacuated gap therebetween.

30. The thermal resistant system of claim 19, wherein the means for selectively actuating at least one of the source of vacuum and the source of pressurized gas comprises a control assembly that comprises:
a processor in communication with the source of vacuum, the source of pressurized gas, the first pressure sensor, and the second pressure sensor.

31. A thermal resistant system comprising:
a plurality of dynamic multi-pane assemblies, each dynamic multi-pane assembly comprising:
at least one gas permeable pane, wherein each gas permeable pane is formed into a sheet and comprises a polymer;
a first exterior pane spaced from the at least one gas permeable pane and defining an evacuated gap between the at least one gas permeable pane and the first exterior pane, the evacuated gap having a predetermined thickness within which a vacuum is drawn; and
a second exterior pane spaced from the at least one gas permeable pane and defining a pressurized gap between the at least one gas permeable pane and the second exterior pane;
a vacuum source in communication with the evacuated gap of each dynamic multi-pane assembly;
a source of pressurized gas in communication with the pressurized gap of each dynamic multi-pane assembly;
a first pressure sensor in communication with the processor and the evacuated gap; and
a second pressure sensor in communication with the processor and the pressurized gap,
a means for, in response to sensed pressure from at least one the respective first and second pressure sensors, selectively actuates at least one of the source of vacuum and the source of pressurized gas to maintain a set level of vacuum within the evacuated gap and a set level of pressure within the pressurized gap of each dynamic multi-pane assembly at a desired level,
wherein the source of pressurized gas is pressurized at a set level that is greater than or equal to a barometric pressure of the external environment, wherein gas from the pressurized gap permeates through the at least one permeable pane and into communication with the evacuated gap, and wherein the vacuum within the evacuated gap can be selectively configured to maintain the thermal resistance of the assembly at a desired level.

32. The thermal resistant system of claim 31, further comprising a vacuum duct in communication with the vacuum source and the evacuated gaps of each dynamic multi-pane assembly and a pressure duct in communication with the source of pressurized gas and the respective first and second pressurized gaps of each dynamic multi-pane assembly.

33. The thermal resistant system of claim 31, wherein the control assembly further comprises a third pressure sensor in communication with the external environment, and wherein the processor, in response to sensed pressure from the third pressure sensor and at least one of the first and second pressure sensors, selectively actuates at least one of the source of vacuum and the source of pressurized gas to maintain the set level of vacuum within the evacuated gap and a set level of pressure within the pressurized gaps of each dynamic multi-pane assembly at the desired level.

34. The thermal resistant system of claim 31, wherein each dynamic multi-pane assembly further comprises a frame, and wherein the respective at least one gas permeable pane and the respective first and second exterior panes are spaceably mounted therein the frame of each dynamic multi-pane assembly.

35. The thermal resistant system of claim 31, wherein the at least one permeable pane and the first and second exterior panes of each dynamic multi-pane assembly are formed of a transparent material.

36. The thermal resistant system of claim 35, wherein the polymer is polycarbonate.

37. The thermal resistant system of claim 35, wherein the first and second exterior panes of each dynamic multi-pane assembly are formed of tempered glass.

38. The thermal resistant system of claim 31, wherein the pressurized gas is one of at least air, nitrogen, argon, krypton and xenon.

39. The thermal resistant system of claim 31, wherein the pressurized gas is air, and wherein the air has a low relative humidity.

40. The thermal resistant system of claim 31, wherein the vacuum within the evacuated gap is a partial vacuum.

41. The thermal resistant system of claim 31, wherein the means for selectively actuating at least one of the source of vacuum and the source of pressurized gas comprises a control assembly that comprises a processor in communication with the source of vacuum, the source of pressurized gas, the first pressure sensor, and the second pressure sensor.

\* \* \* \* \*